Aug. 29, 1944.   G. HANIQUET   2,356,998
TOWING ATTACHMENT
Filed March 27, 1942
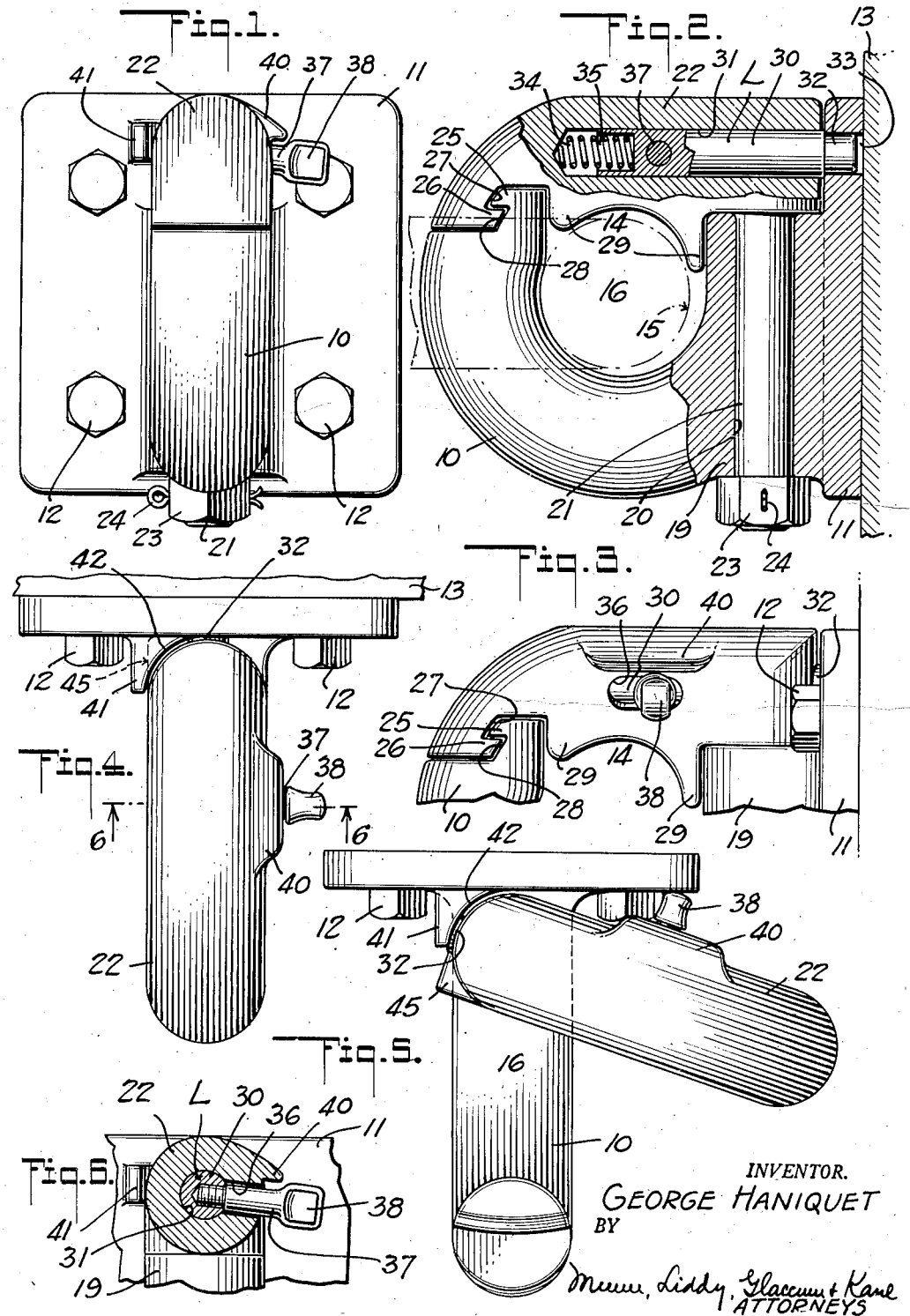
INVENTOR.
GEORGE HANIQUET
BY
Mumm, Liddy, Glascum & Kane
ATTORNEYS Patented Aug. 29, 1944

2,356,998

UNITED STATES PATENT OFFICE 2,356,998

TOWING ATTACHMENT

George Haniquet, Glendale, Calif.

Application March 27, 1942, Serial No. 436,460

11 Claims. (Cl. 280—33.15)

This invention relates to towing attachments of the general character embodied in my U. S. Patent No. 2,239,320, issued April 22, 1941, and wherein is disclosed a device characterized by means enabling vehicles to be coupled and uncoupled without the use of tools; which reduces backlash of the trailer tongue in the towing hook so as to insure a non-rattling connection; and which insures retention of the trailer tongue in the towing hook when coupled together.

The primary object of the present invention is to provide a towing attachment which is structurally characterized by its ruggedness, compactness, smooth streamlined exterior surfaces reducing its susceptibility to damage to a minimum; which is composed of a lesser number of simplified parts capable of being readily assembled so as to reduce the cost of manufacture; and which includes a novel and ingenious construction and arrangement of latching mechanism for automatically latching the gate in its closing position relative to the towing hook, upon swinging of the gate to hook-closing position.

Another object of this invention is to provide a towing attachment of the above described character wherein the automatic latching mechanism is mounted and concealed in the gate in a manner to be practically damage, dirt and moistureproof, yet is readily actuable manually to non-latching position by means of an actuator which will be completely clear of the trailer tongue when dropped onto the gate or into the hook, so as not to be damaged thereby.

With these and other objects in view, the invention resides in the combinations, arrangements and functional relationships of elements as set forth in the following specification and particularly pointed out in the appended claims.

In the accompanying drawing,

Figure 1 is a view of the towing attachment in front elevation;

Figure 2 is a view of the towing attachment in side elevation, partly in section to illustrate structural features of the automatic latching mechanism;

Figure 3 is a fragmentary view in side elevation, illustrating the dirt and moistureproof features of the latching mechanism;

Figure 4 is a plan view of the towing attachment in its closed or coupling position;

Figure 5 is a view similar to Figure 4 with the gate of the attachment in open position for connection of the trailer tongue to the towing hook;

Figure 6 is a fragmentary sectional view taken on the line 6—6 of Figure 4.

Referring specifically to the drawing, the invention comprises a generally U-shaped towing hook 10 projecting from a flange 11, which latter can be associated with the draw bar structure of my patent above referred to, or can, by means of bolts 12, be secured directly to a cross member 13 of the draft or towing vehicle (not shown), so as to preferably support the hook 10 in a vertical position with the opening 14 of the hook uppermost to pass the trailer tongue 15 downwardly into the hook space 16.

That portion of the towing hook 10 nearest the flange 11 is formed to provide a hub 19, the bore 20 of which has rotatably mounted therein a hinge pin 21 formed on a locking bar or gate 22 which, in the closed position shown in all figures except Figure 5, spans the opening 14 to the hook space 16 so as to confine the trailer tongue 15 (shown in broken lines in Figure 2) against disconnection from the hook. The free end of the pin 21 is threaded to receive a nut 23 which coacts with a cotter pin 24 and with the gate 22, to confine the pin against axial displacement.

The towing hook 10 and the gate 22 are provided with oppositely projecting lips 25 and 26, respectively, which enter recesses 27 and 28 in the gate and hook, respectively, when the gate occupies its closed position, whereby to prevent disengagement of the gate from the hook in a transverse or radial direction by the pulling load upon the hook, or should the gate be struck by the trailer tongue. The gate is provided with filler pieces 29 which enter the hook space 16 and confine the trailer tongue therein so as to reduce idle motion or backlash to minimum.

The gate 22 is provided with a latch mechanism designated generally at L and composed of a latch bolt 30 reciprocably mounted in a bore 31 in the gate, and provided at its outer end with a latching portion 32 of reduced diameter adapted to enter a keeper opening 33 in the flange 11 under the urging action of a coil spring 34.

The spring 34 is mounted in the inner end of the bore 31 and rests at one end in a pocket 35 in the bolt 30 as clearly shown in Figure 2. Secured to the bolt 30 and projecting through a downwardly and outwardly inclined, longitudinal slot 36 in the wall of the gate containing the bore 31, is an actuator 37 having a knob 38 adapted to be grasped to retract the bolt 30 sufficiently to disengage the latching portion 32 thereof from the keeper opening 33 so as to permit the gate to be swung from the closed position shown in Figure 4 to the open position shown in Figure 5 and thus leave the opening 14 entirely unobstructed for the trailer tongue to be dropped therethrough into the hook space 16.

Directly above and overlapping the ends of the slot 36 is a roof forming projection 40 from the gate 22 (Figures 3 and 6) which functions to shed moisture sufficiently to prevent its entrance into the slot 36; and it will be noted that in all positions of the bolt 30, it spans the entire length of the slot so as to prevent the entrance of moisture and foreign substances into the bore 31 with possible adverse effect upon the latch mechanism.

Projecting from the face of the flange 11 is a guiding lug 41 (Figure 4) having an arcuate track surface 42 struck from the axis of the hinge pin 21, upon which the outer end of the latching portion 32 of the bolt 30 rides during movement of the gate 22 between its two extreme positions, whereby to confine the bolt against excessive projection from the bore 31 and insure proper coaction of the latching portion 32 with the keeper opening 33.

Projecting from the gate 22 is a stop lug 45 (Figure 5) which definitely limits movement of the gate towards its latching position, so that when the latter is reached, the bolt 30 will be automatically advanced by the spring 34 into latching engagement with the keeper opening 33, to thereby effect latching of the gate automatically upon merely swinging the gate to its closed position.

From the foregoing description it will be manifest that the towing attachment embodying my invention is of materially simplified and rugged, streamlined construction, the parts of which can be readily assembled, and that the simplified latching mechanism with its automatic latching feature, is arranged to permit ease of assembly, and is protected in a manner to prevent dirt and moisture from adversely affecting its smooth operation, as well as to prevent damage to the mechanism by the trailer tongue during the coupling and uncoupling operations.

I claim:

1. A towing attachment comprising: a generally U-shaped hook having a hub at one side thereof; a flange projecting from the hub and having a keeper opening disposed beyond one end of the hub; a locking bar having a laterally projecting hinge pin rotatably mounted in the hub to mount the bar at said end of the hub for swinging movement across the hook opening to close or clear the latter according as the bar occupies one extreme position or another; said bar having a longitudinal bore therein; a latch bolt mounted in said bore for movement axially to occupy advanced and retracted positions; a spring in said bore for uring said bolt to its advanced position wherein the end of the bolt will enter said keeper opening to latch the locking bar in its closing position with respect to the opening of the hook; and manually operable means by which the bolt can be retracted.

2. A towing attachment comprising: a generally U-shaped hook having a hub at one side thereof; a flange projecting from the hub and having a keeper opening disposed beyond one end of the hub; a locking bar having a laterally projecting hinge pin rotatably mounted in the hub to mount the bar at said end of the hub for swinging movement across the hook opening to close or clear the latter according as the bar occupies one extreme position or another; said bar having a longitudinal bore therein; a latch bolt mounted in said bore for movement axially to occupy advanced and retracted positions; a spring in said bore for urging said bolt to its advanced position wherein the end of the bolt will enter said keeper opening to latch the locking bar in its closing position with respect to the opening of the hook; the locking bar having a longitudinal slot extending downwardly and outwardly from said bore; an actuator secured to said bolt and projecting through said slot for manipulation of the bolt to retracted position; and a roof-forming projection on the bar, overlying said slot to protect the latter against the entrance of moisture and foreign substances.

3. A towing attachment comprising: a generally U-shaped hook having a hub at one side thereof; a flange projecting from the hub and having a keeper opening disposed beyond one end of the hub; a locking bar having a laterally projecting hinge pin rotatably mounted in the hub to mount the bar at said end of the hub for swinging movement across the hook opening to close or clear the latter according as the bar occupies one extreme position or another; said bar having a longitudinal bore therein; a latch bolt mounted in said bore for movement axially to occupy advanced and retracted positions; a spring in said bore for urging said bolt to its advanced position wherein the end of the bolt will enter said keeper opening to latch the locking bar in its closing position with respect to the opening of the hook; manually operable means by which the bolt can be retracted; and means on said flange co-acting with said bolt to maintain the latter in retracted position during movement of the latching bar from closing position, for entrance of the bolt into said keeper opening automatically when the locking bar is restored to its closing position.

4. A towing attachment comprising: a generally U-shaped hook having a hub at one side thereof; a flange projecting from the hub and having a keeper opening disposed beyond one end of the hub; a locking bar having a laterally projecting hinge pin rotatably mounted in the hub to mount the bar at said end of the hub for swinging movement across the hook opening to close or clear the latter according as the bar occupies one extreme position or another; said bar having a longitudinal bore therein; a latch bolt mounted in said bore for movement axially to occupy advanced and retracted positions; a spring in said bore for urging said bolt to its advanced position wherein the end of the bolt will enter said keeper opening to latch the locking bar in its closing position with respect to the opening of the hook; the locking bar having a longitudinal slot extending downwardly and outwardly from said bore; an actuator secured to said bolt and projecting through said slot for manipulation of the bolt to retracted position; a roof-forming projection on the bar, overlying said slot to protect the latter against the entrance of moisture and foreign substances; and a lug projecting from said flange and having a track on which the end of said bolt rides during movement of the locking bar from closing position, so as to maintain the bolt in retracted position for entrance into said keeper opening automatically, when the locking bar is restored to its closing position.

5. A towing attachment comprising: a generally U-shaped hook adapted to be secured to a draft vehicle with the hook vertically disposed and the opening to its hook space uppermost; the hook having a vertical hub at one side thereof; a vertical flange projecting from the hub and having a horizontal keeper opening disposed beyond the upper end of the hub; a lock bar having a longitudinal bore therein; a hinge pin projecting laterally from the lock bar and rotatably mounted in said hub to mount the lock bar on the hook for swinging movement from a position closing said hook space and wherein said keeper opening and bore are co-axially related, to a position leaving said hook space open for the reception of a trailer tongue; a latch bolt reciprocally mounted in said bore; means yieldingly urging said bolt to a projected position wherein the bolt enters said keeper opening when the lock bar occupies its first mentioned position, whereby to latch the lock bar therein; and means by which said bolt can be manually moved to a retracted position to release the bolt from the keeper opening.

6. A towing attachment comprising: a generally U-shaped hook adapted to be secured to a draft vehicle with the hook vertically disposed and the opening to its hook space uppermost; the hook having a vertical hub at one side thereof; a vertical flange projecting from the hub and having a horizontal keeper opening disposed beyond the upper end of the hub; a lock bar having a longitudinal bore therein; a hinge pin projecting laterally from the lock bar and rotatably mounted in said hub to mount the lock bar on the hook for swinging movement from a position closing said hook space and wherein said keeper opening and bore are co-axially related, to a position leaving said hook space open for the reception of a trailer tongue; a latch bolt reciprocably mounted in said bore; means yieldingly urging said bolt to a projected position wherein the bolt enters said keeper opening when the lock bar occupies its first mentioned position, whereby to latch the lock bar therein; the lock bar having a laterally disposed, outwardly and downwardly inclined slot extending longitudinally of the bar at a side thereof and in communication with said bore; an actuator secured to the bolt and projecting through said slot for manipulation to move the bolt to a retracted position to release the bolt from the keeper opening; a roof-forming projection on the lock bar above said slot to shield the latter; and a lug projecting from said flange, having a track on which said bolt rides to maintain the bolt retracted during movement of the lock bar between its aforesaid positions, for entrance of the bolt automatically into the keeper opening when the lock bar occupies its first mentoined position.

7. A towing attachment comprising: a generally U-shaped hook having a hub adjacent to the side that is secured to a vehicle; a locking bar having a laterally projecting hinge pin rotatably mounted in the hub for swinging movement across the hook opening to close or clear the latter according as the bar occupies one extreme position or another; said bar having an inwardly facing arcuate lip adapted to contact an outwardly facing arcuate lip on the hook for reinforcing the free end of the hook when the bar is in closed position; said bar having a longitudinal bore therein; a latch bolt mounted in said bore for movement axially to occupy advanced and retracted positions; said hub side having an opening for receiving the bolt when the latter is in advanced position, whereby the bar will be locked in closed position.

8. A towing attachment comprising: a generally U-shaped hook having a hub adjacent to the side that is secured to a vehicle; a locking bar having a laterally projecting hinge pin rotatably mounted in the hub for swinging movement across the hook opening to close or clear the latter according as the bar occupies one extreme position or another; said bar having an inwardly facing arcuate lip adapted to contact an outwardly facing arcuate lip on the hook for reinforcing the free end of the hook when the bar is in closed position; said bar having a longitudinal bore therein; a latch bolt mounted in said bore for movement axially to occupy advanced and retracted positions; said hub side having an opening for receiving the bolt when the latter is in advanced position, whereby the bar will be locked in closed position, an actuator secured to said bolt; and a roof-forming projection on the bar to protect the actuator and bolt from moisture.

9. A towing attachment comprising: a generally U-shaped hook having a hub adjacent to the side that is secured to a vehicle; a locking bar having a laterally projecting hinge pin rotatably mounted in the hub for swinging movemen across the hook opening to close or clear the latter according as the bar occupies one extreme position or another; said bar having an inwardly facing arcuate lip adapted to contact an outwardly facing arcuate lip on the hook for reinforcing the free end of the hook when the bar is in closed position; said bar having a longitudinal bore therein; a latch bolt mounted in said bore for movement axially to occupy advanced and retracted positions; said hub side having an opening for receiving the bolt when the latter is in advanced position, whereby the bar will be locked in closed position; spring means for urging the bolt into advanced position; and means on said side coacting with the bolt for maintaining the latter in retracted position during movement of the latching bar from closing position for entrance of the bolt into said opening automatically when the locking bar is restored to its closing position.

10. A towing attachment comprising: a generally U-shaped hook having a hub adjacent to the side that is secured to a vehicle; a locking bar having a laterally projecting hinge pin rotatably mounted in the hub for swinging movement across the hook opening to close or clear the latter according as the bar occupies one extreme position or another; said bar having an inwardly facing arcuate lip adapted to contact an outwardly facing arcuate lip on the hook for reinforcing the free end of the hook when the bar is in closed position; said bar having a longitudinal bore therein; a latch bolt mounted in said bore for movement axially to occupy advanced and retracted positions; said hub side having an opening for receiving the bolt when the latter is in advanced position, whereby the bar will be locked in closed position, an actuator secured to said bolt; and a roof-forming projection on the bar to protect the actuator and bolt from moisture, said actuator being disposed on a side of the bar that will be farthest removed from the open end of the hook when the bar is in open position, whereby the actuator will be protected from the eye when the latter is mounted on the hook.

11. A towing attachment comprising: a genererally U-shaped hook having a hub adjacent to the side that is secured to a vehicle; a locking bar having a laterally projecting hinge pin rotatably mounted in the hub for swinging movement across the hook opening to close or clear the latter according as the bar occupies one extreme position or another; said bar having an inwardly facing arcuate lip adapted to contact an outwardly facing arcuate lip on the hook for reinforcing the free end of the hook when the bar is in closed position; said bar having a longitudinal bore therein; a latch bolt mounted in said bore for movement axially to occupy advanced and retracted positions; said hub side having an opening for receiving the bolt when the latter is in advanced position, whereby the bar will be locked in closed position; and a stop for limiting further swinging of the bar beyond closed position when the bar reaches closed position.

GEORGE HANIQUET.